US012679435B2

(12) United States Patent
Jiang

(10) Patent No.: US 12,679,435 B2
(45) Date of Patent: Jul. 14, 2026

(54) HANDCART CAPABLE OF BEING LATERALLY OPENED

(71) Applicant: Zhongshan Weihong Daily Necessities Co., Ltd., Zhongshan (CN)

(72) Inventor: Yidong Jiang, Zhongshan (CN)

(73) Assignee: Zhongshan Weihong Daily Necessities Co., Ltd., Zhongshan (CN)

( * ) Notice: Subject to any disclaimer, the term of this patent is extended or adjusted under 35 U.S.C. 154(b) by 0 days.

(21) Appl. No.: 19/321,174

(22) Filed: Sep. 6, 2025

(65) Prior Publication Data

US 2026/0001584 A1      Jan. 1, 2026

(30) Foreign Application Priority Data

Jul. 22, 2025    (CN) .......................... 202521529177.0

(51) Int. Cl.
B62B 3/04          (2006.01)
B62B 3/02          (2006.01)
B62B 5/06          (2006.01)

(52) U.S. Cl.
CPC .................. B62B 3/04 (2013.01); B62B 3/02 (2013.01); B62B 5/06 (2013.01)

(58) Field of Classification Search
CPC .......... B62B 3/004; B62B 3/007; B62B 3/025
See application file for complete search history.

(56) References Cited

U.S. PATENT DOCUMENTS

| | | | | | |
|---|---|---|---|---|---|
| 5,873,204 | A | * | 2/1999 | Gehn ...................... | B62B 3/004 |
| | | | | | 49/503 |
| 6,913,271 | B2 | * | 7/2005 | Gordon ................ | A01K 1/0236 |
| | | | | | 297/484 |
| 7,055,833 | B2 | * | 6/2006 | Wixted ................... | B62B 3/006 |
| | | | | | 312/223.6 |
| 9,145,154 | B1 | * | 9/2015 | Horowitz .............. | B62B 5/0013 |
| 9,428,205 | B2 | * | 8/2016 | Jackson ................ | B62B 3/1476 |
| 9,731,779 | B2 | * | 8/2017 | Lamb .................... | B62D 51/001 |
| 9,896,118 | B2 | * | 2/2018 | Choi ........................ | B62B 3/007 |
| 10,300,934 | B2 | * | 5/2019 | Ostergaard .............. | B62B 5/082 |
| 10,414,422 | B2 | * | 9/2019 | Choi ........................ | B62B 9/082 |
| 11,110,947 | B2 | * | 9/2021 | Finstad ................... | B62B 3/004 |

(Continued)

FOREIGN PATENT DOCUMENTS

| | | |
|---|---|---|
| CN | 216833716 U | 6/2022 |
| CN | 219382532 U | 7/2023 |
| CN | 219989273 U | 11/2023 |

*Primary Examiner* — Jeffrey J Restifo
(74) *Attorney, Agent, or Firm* — JEEN IP LAW, LLC

(57)            ABSTRACT

The present invention discloses a handcart capable of being laterally opened, comprising a bottom frame, two first pillars and two second pillars. Connecting rods are provided between the two first pillars and between the two second pillars. Each first pillar is equipped with a first moving wheel at the bottom, and each second pillar is equipped with a second moving wheel at the bottom. A cart door capable of rotating to open and close the handcart frame is movably arranged between the first pillar and the second pillar located on the same side. The cart door allows the first and second pillars on the same side to form one side surface of the handcart capable of being laterally opened, and at the same time, the cart door can rotate around one of the pillars, facilitating the placement of items inside the handcart capable of being laterally opened.

16 Claims, 8 Drawing Sheets

(56) References Cited

U.S. PATENT DOCUMENTS

| | | | | |
|---|---|---|---|---|
| 11,332,177 B2 * | 5/2022 | Lucas | | B62B 3/10 |
| 11,465,664 B1 * | 10/2022 | Choi | | B62B 3/025 |
| 11,891,100 B2 * | 2/2024 | Park | | B62B 3/004 |
| 11,981,364 B2 * | 5/2024 | Ma | | B62B 5/0461 |
| 12,157,512 B1 * | 12/2024 | Jiang | | B62B 3/02 |
| 12,269,644 B1 * | 4/2025 | Greenbaum | | B62B 3/025 |
| 12,371,084 B2 * | 7/2025 | Qiao | | B62B 5/067 |
| 12,454,301 B1 * | 10/2025 | Jiang | | B62B 3/007 |
| 12,479,491 B1 * | 11/2025 | Li | | B62B 3/007 |
| 12,485,944 B2 * | 12/2025 | Jiang | | B62B 3/007 |
| 12,491,922 B1 * | 12/2025 | Qiao | | B62B 3/007 |
| 12,509,134 B1 * | 12/2025 | Huang | | B62B 3/007 |
| 12,515,727 B2 * | 1/2026 | Zhang | | B62B 3/025 |
| 2023/0399040 A1 * | 12/2023 | Skeid | | A47B 47/0083 |
| 2024/0059332 A1 * | 2/2024 | Frankel | | B62B 3/12 |
| 2025/0162639 A1 * | 5/2025 | Zehfuss | | B62B 3/007 |
| 2025/0196902 A1 * | 6/2025 | Zhang | | B62B 3/007 |
| 2025/0304139 A1 * | 10/2025 | Kim | | B62B 9/102 |
| 2025/0326417 A1 * | 10/2025 | Zhang | | B62B 5/067 |
| 2025/0346276 A1 * | 11/2025 | Lin | | B62B 7/008 |
| 2025/0353531 A1 * | 11/2025 | Jiang | | B62B 3/002 |
| 2025/0368243 A1 * | 12/2025 | Yang | | B62B 3/007 |
| 2026/0001584 A1 * | 1/2026 | Jiang | | B62B 3/04 |

* cited by examiner

HANDCART CAPABLE OF BEING LATERALLY OPENED

CROSS-REFERENCE TO RELATED APPLICATIONS

The application claims priority to Chinese patent application No. 202521529177.0, filed on Jul. 22, 2025, the entire contents of which are incorporated herein by reference.

TECHNICAL FIELD

The present invention relates to the technical field of handcart, and particularly to a handcart capable of being laterally opened.

BACKGROUND

Traditional handcarts, with their advantages of simple structure, flexible movement, and strong carrying capacity, are widely used in logistics and transportation, warehouse management, retail services, and other fields. Their open cargo box design allows for quick loading and unloading of conventional-sized goods, and, coupled with the universal wheel structure, can adapt to the needs of moving over various terrains, significantly enhancing the efficiency of short-distance transportation.

However, existing handcarts generally have functional limitations. Their lateral enclosed structure requires loading and unloading of goods to be performed from the front. When storing bulky or irregularly shaped items, it is often necessary to tilt the cart or manually lift the goods, which not only increases labor consumption but also poses a risk of overturning. The fixed cargo box space cannot be flexibly adjusted, making it difficult to accommodate the classification and storage needs of different specifications of goods. In addition, the single transportation function limits its applicability in scenarios such as temporary warehousing and multi-category sorting, restricting further improvement in operational efficiency.

SUMMARY

To address the aforementioned technical issues, the present invention provides a handcart capable of being laterally opened.

The present invention is realized by the following technical solutions:

A handcart capable of being laterally opened, comprising a bottom frame, at least two first pillars arranged on a front side of the bottom frame and at least two second pillars arranged on a rear side of the bottom frame, wherein connecting rods are provided between the two first pillars and between the two second pillars, each of the first pillars is equipped with a first moving wheel at its bottom, and each of the second pillar is equipped with a second moving wheel at its bottom, a cart door configured to be rotated for opening and closing a frame of the handcart is movably arranged between the first pillar and the second pillar located on a same side.

Thus, the cart door allows the first pillar and the second pillar located on the same side to form one side of the handcart capable of being laterally opened. In this case, the cart door can also rotate around one of the pillars, facilitating the placement of items inside the handcart capable of being laterally opened.

In the handcart capable of being laterally opened as described above, rotating members for installing the cart door are arranged on both the two first pillars at the front side of the bottom frame and on both the two second pillars at the rear side of the bottom frame, a side surface formed by the first pillar and the second pillar located on the same side is opened or closed through a cooperation between the cart door and the rotating members.

In the handcart capable of being laterally opened mentioned above, the rotating member is a hinge shaft structure hingedly connected to one end of the cart door.

In the handcart capable of being laterally opened as described above, a first cart door is arranged at the first pillar, a second cart door is arranged at the second pillar, the first cart door on the first pillar and the second cart door on the second pillar, which are located on the same side, form one side of the frame of the handcart.

In the handcart capable of being laterally opened as described above, the first cart door on the first pillar and the second cart door on the second pillar, which are located on the same side, are provided with a locking member for controlling the closing or opening of the first cart door and the second cart door, the locking member comprises a rotating shaft, a connecting shaft, and a limiting shaft.

In the handcart capable of being laterally opened as described above, the first cart door is provided with a first mounting hole for mounting the locking member, the second cart door is provided with a second mounting hole for cooperating with and mounting of the locking member, the rotating shaft of the locking member is configured to move laterally within the first mounting hole and rotate around the first mounting hole, and the limiting shaft of the locking member is configured to cooperate with the second mounting hole to allow the first cart door and the second cart door located on the same side to close and form a side surface.

In the handcart capable of being laterally opened as described above, the first cart door is provided with a first groove having an inner diameter larger than that of the first mounting hole at a position corresponding to the first mounting hole, the second cart door is provided with a second groove having an inner diameter larger than that of the second mounting hole at a position corresponding to the second mounting hole, and the limiting shaft is provided with a locking pin corresponding to the first groove and the second groove for forming a temporary fixation.

In the handcart capable of being laterally opened as described above, a brake lever is arranged between two of the first moving wheels, a latch wheel with gear teeth is arranged on a side of the first moving wheel close to the brake lever, and a cooperating member that moves with a rotation of the brake lever and cooperates with the gear teeth of the latch wheel to achieve braking and stopping is arranged on one side of the brake lever, the brake lever is provided with a brake pedal for stepping on to drive its rotation.

The handcart capable of being laterally opened as described above further comprising a cart canopy and a U-shaped supporting rod for supporting the cart canopy, the rotating member is provided with an alignment mounting hole for cooperating with, clamping and mounting a support leg of the supporting rod, both the first pillar and the second pillar are provided with a limiting member corresponding to the alignment mounting hole for limiting a position of the support leg, the limiting members on the first pillar and the second pillar are located on the same horizontal plane, a handlebar is provided between two of the first pillars and between two of the second pillars, respectively, and the handlebars on the front and rear sides are rotatably connected to the two first pillars and the two second pillars, respectively In the handcart capable of being laterally opened as described above, a cart door configured to be rotated for opening and closing the frame of the handcart is movably arranged between the first pillar and the second pillar located on the same side, one end of the cart door is rotatably connected to the first pillar, and the other end of the cart door is provided with a locking device for temporary fixation with the second pillar.

Compared with the existing technology, the handcart capable of being laterally opened proposed in this invention has the following beneficial effects:

1. The cart door mentioned can enable the first pillar and the second pillar located on the same side to form one side of the handcart capable of being laterally opened, and at the same time, the cart door can also rotate around one of the pillars, facilitating the placement of items into the interior of the handcart capable of being laterally opened;

2. The rotating member is capable of driving the vehicle cart door to rotate, allowing the cart door to revolve around either the first pillar or the second pillar, thereby revealing the internal space of the handcart capable of being laterally opened;

3. The braking system facilitates the use of the side-openable handcart, ensuring safety and convenience when it is used as a tool.

BRIEF DESCRIPTION OF DRAWINGS

To illustrate the technical solutions in the embodiments of the present invention more clearly, the accompanying drawings required for the description of the embodiments will be briefly introduced below.

THE REFERENCE NUMBERS CORRESPOND AS FOLLOWS

1. Bottom frame; 11. First pillar; 12. Second pillar; 13. First moving wheel; 131. Latch wheel; 14. Second moving wheel; 15. Connecting rod; 2. Cart door; 21. First cart door; 211. First mounting hole; 212. First groove; 22. Second cart door; 221. Second mounting hole; 222. Second groove; 3. Rotating member; 31. Alignment mounting hole; 4. Locking member; 41. Rotating shaft; 42. Connecting shaft; 43. Limiting shaft; 431. Locking pin; 44. Latch shaft; 5. Cart canopy; 6. Supporting rod; 61. Support leg; 7. Limiting member; 8. Handlebar; 91. Brake lever; 911. Cooperating member; 912. Brake pedal.

DETAILED DESCRIPTION OF THE EMBODIMENTS

To make the technical problems solved by this invention, the technical solutions, and the beneficial effects clearer and more understandable, the following provides a further detailed description of this invention with reference to the accompanying drawings and embodiments. It should be understood that the specific embodiments described here are merely used to explain this invention and are not intended to limit it.

Embodiment 1

According to on the illustrations in FIGS. 1 to 7, the technical solution of the present invention will be detailed explained.

Figure 1:
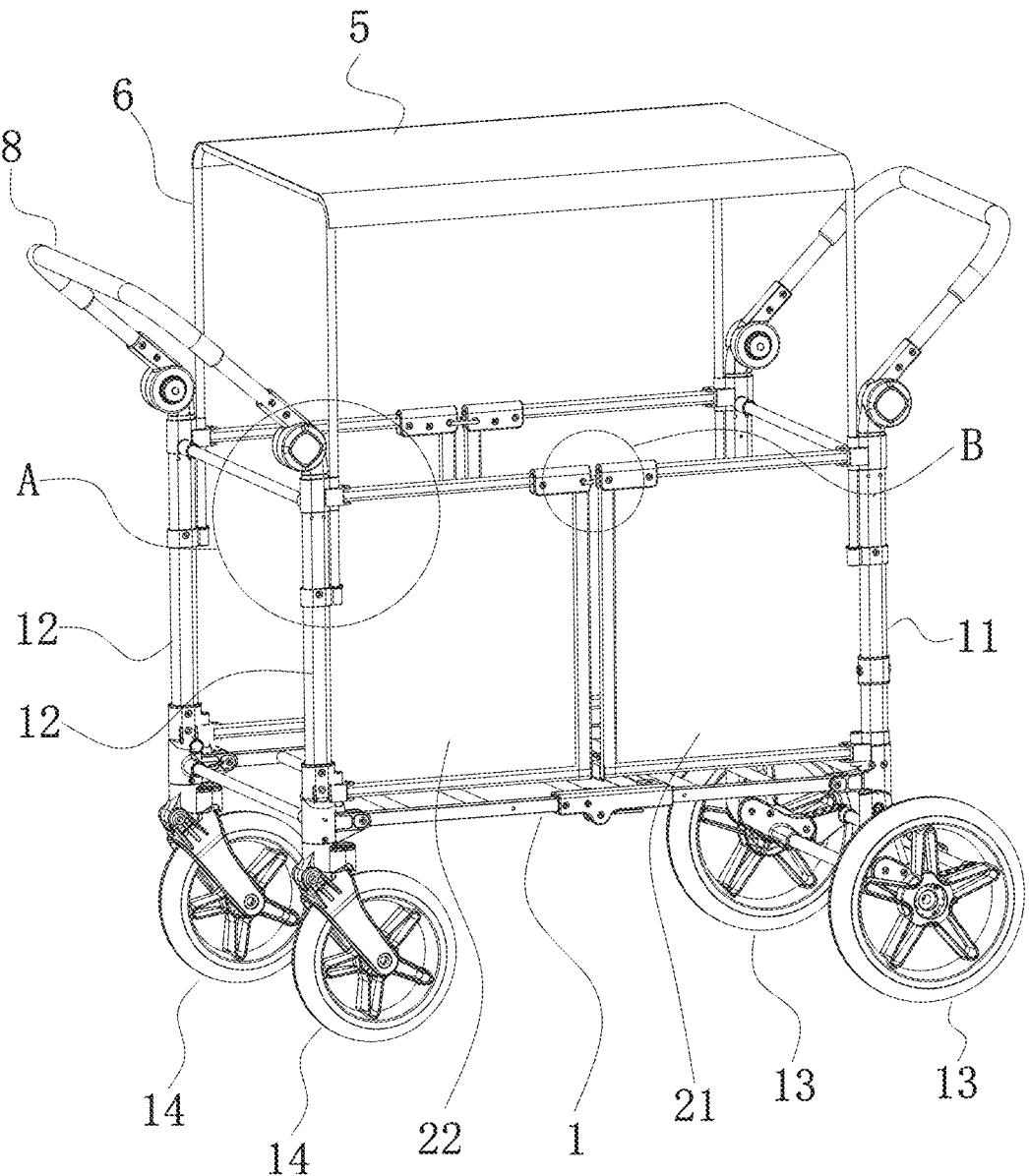
FIG. 1 is a schematic view of a three-dimensional structure according to an embodiment of the present invention.

Refer to FIG. 1, a handcart capable of being laterally opened comprises a bottom frame 1, as well as two first pillars 11 located on the front side of the bottom frame 1 and two second pillars 12 located on the rear side of the bottom frame 1. Connecting rods 15 are provided between the two first pillars 11 and between the two second pillars 12. Each first pillar 11 is equipped with a first moving wheel 13 at its bottom, and each second pillar 12 is equipped with a second moving wheel 14 at its bottom. A cart door 2 capable of rotating to open and close the handcart frame is movably arranged between the first pillar 11 and the second pillar 12 located on the same side. The cart door 2 allows the first pillar 11 and the second pillar 12 located on the same side to form one side surface of the handcart capable of being laterally opened. In this case, the cart door 2 can also rotate around one of the pillars, facilitating the placement of items inside the handcart capable of being laterally opened. In addition, the handcart capable of being laterally opened can also be used as a child's cart, with protective devices and the like arranged inside. By opening the cart door 2, it is convenient for children to enter the interior of the handcart capable of being laterally opened.

Figure 4:
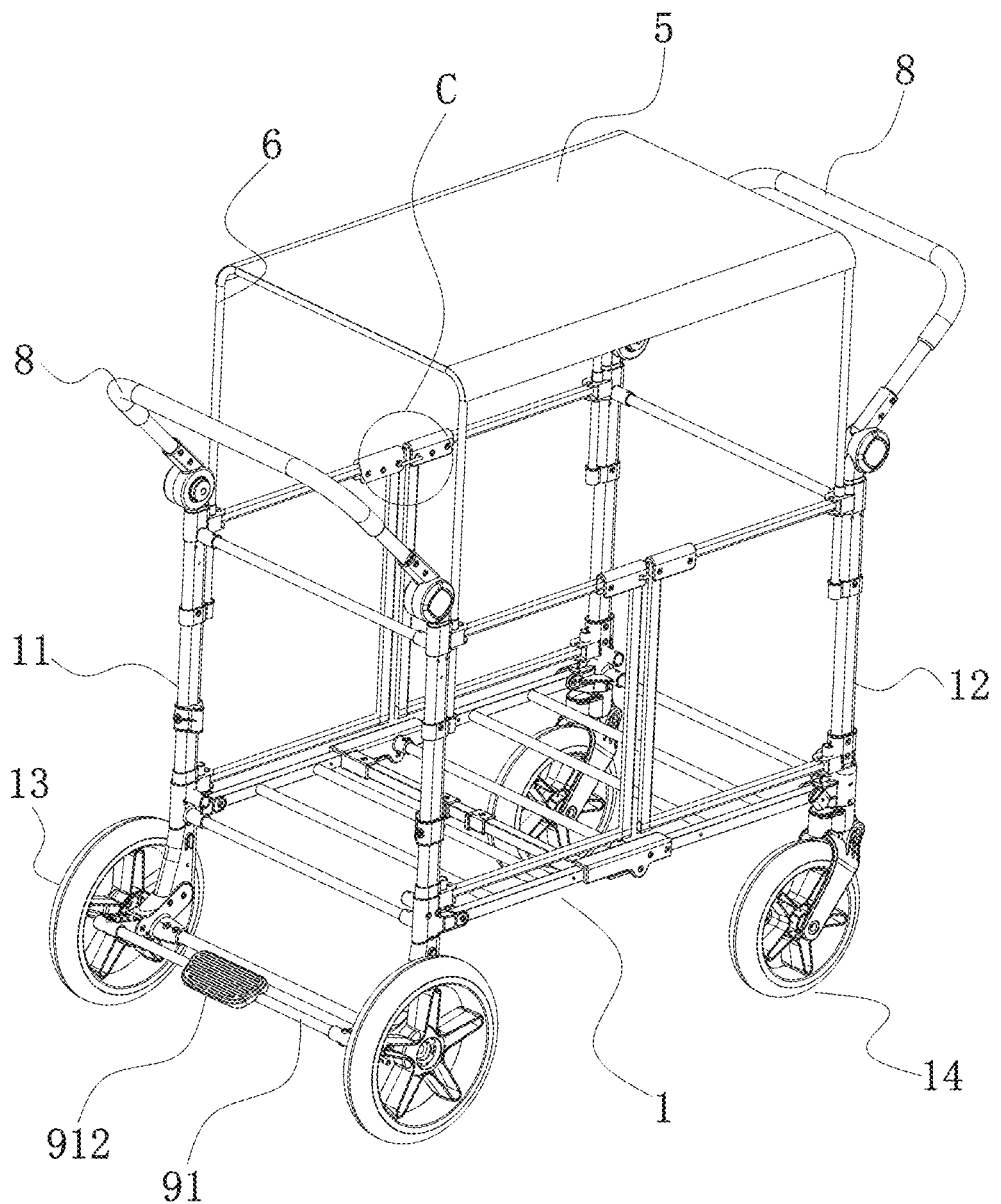
FIG. 4 is a schematic view of a three-dimensional structure in another embodiment of the present invention.
Figure 6:
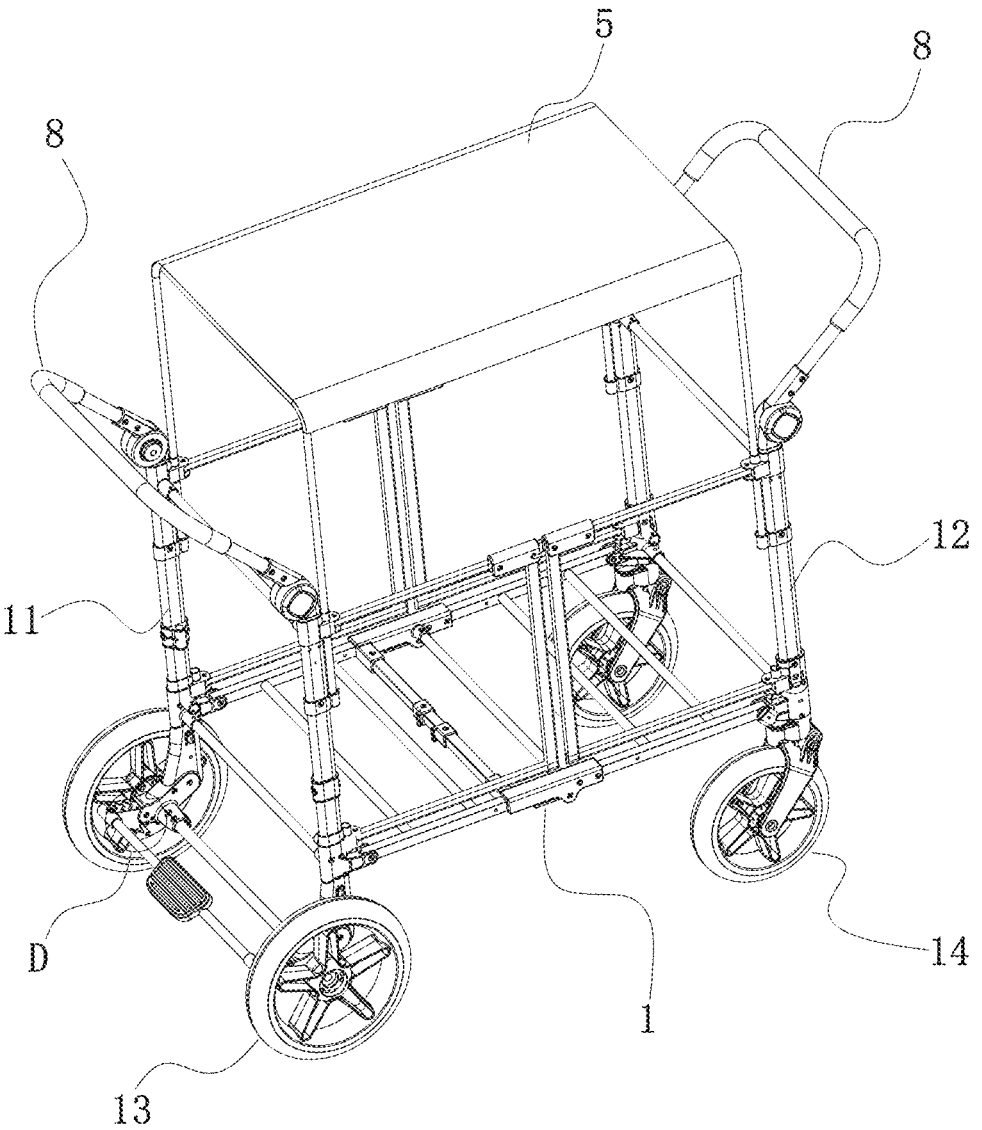
FIG. 6 is a schematic view of FIG. 4 from another perspective.
Figure 7:
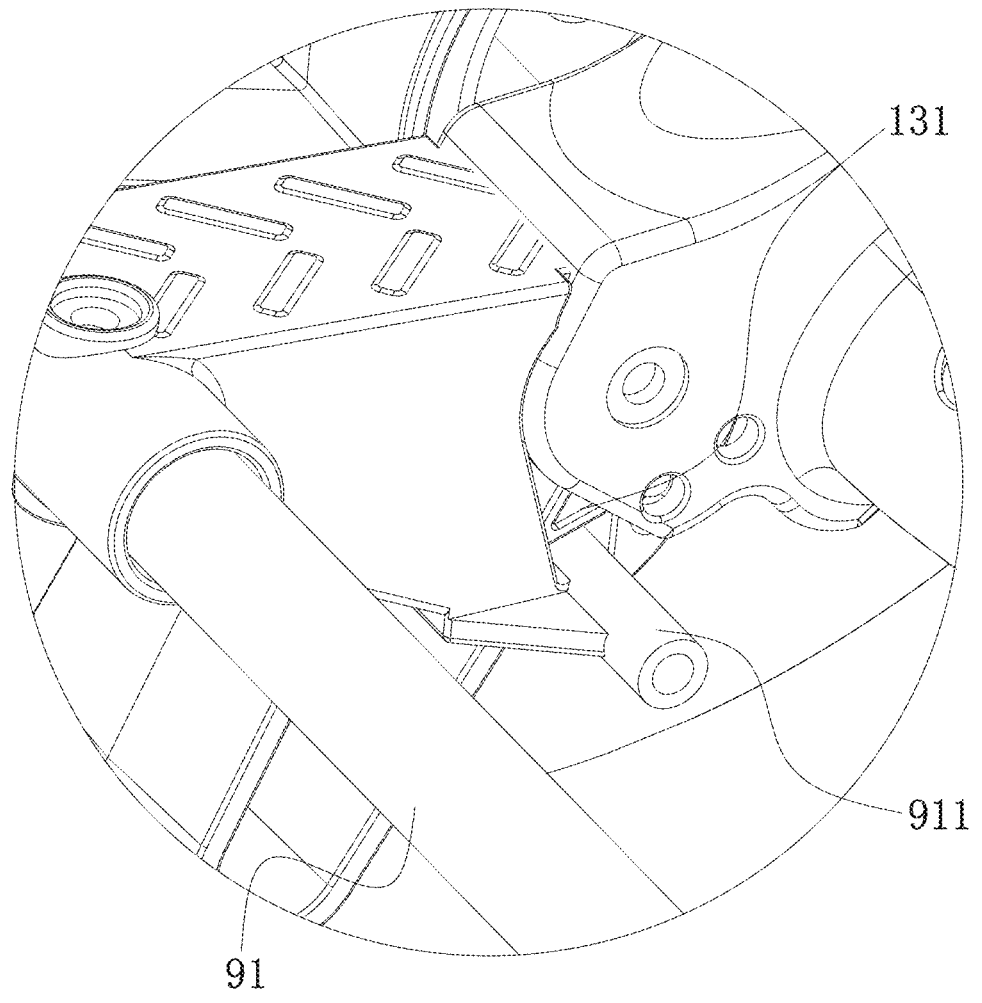
FIG. 7 is an enlarged schematic view of area D in FIG. 6.
Figure 8:
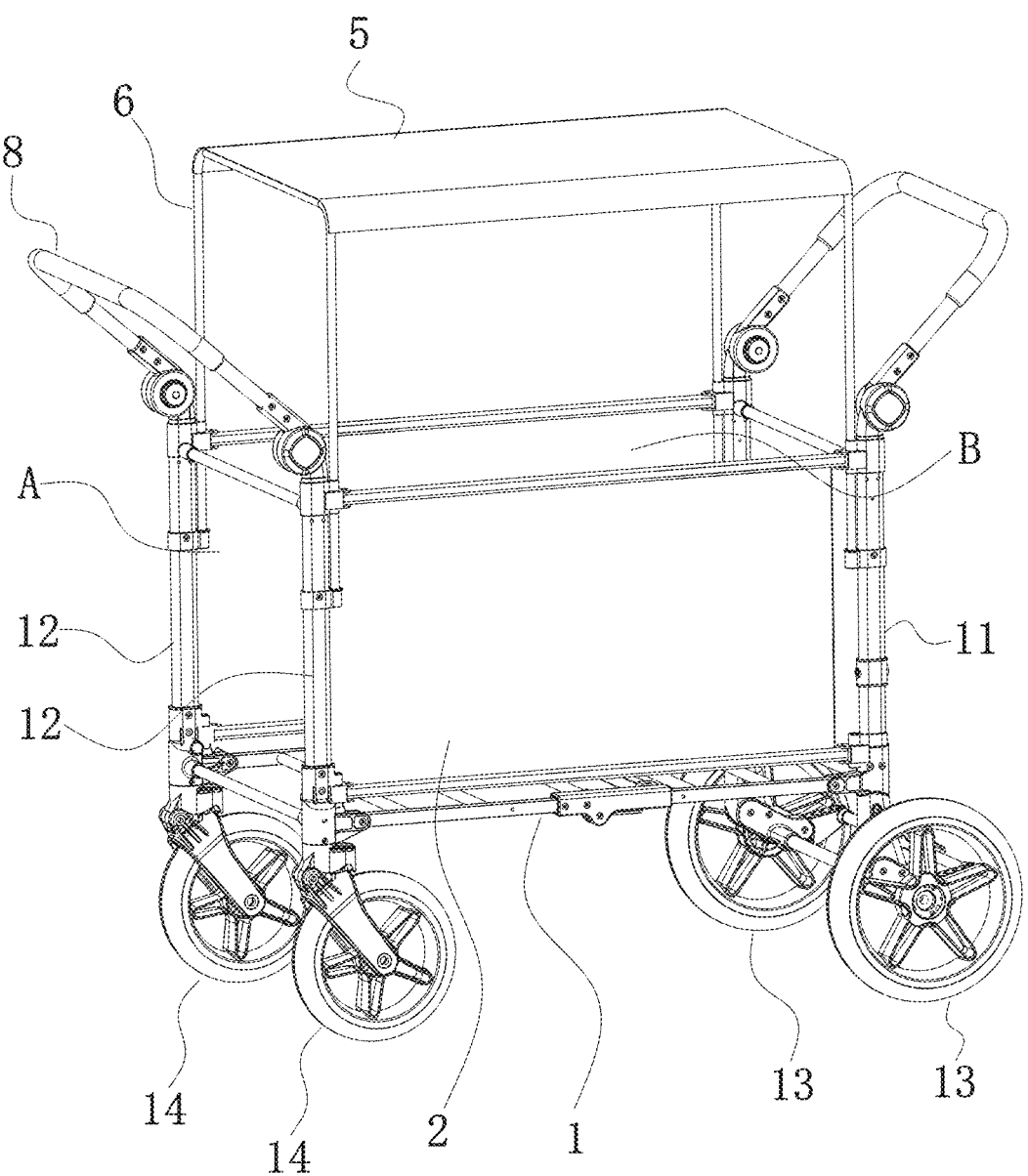
FIG. 8 is a schematic view of a three-dimensional structure in one more embodiment of the present invention.

Alternatively, referring to FIGS. 4 and 6, the cart door 2 can also be of a frame structure, further providing space for stacking internal cargo while significantly reducing its own weight while ensuring load-bearing capacity.

Figure 2:
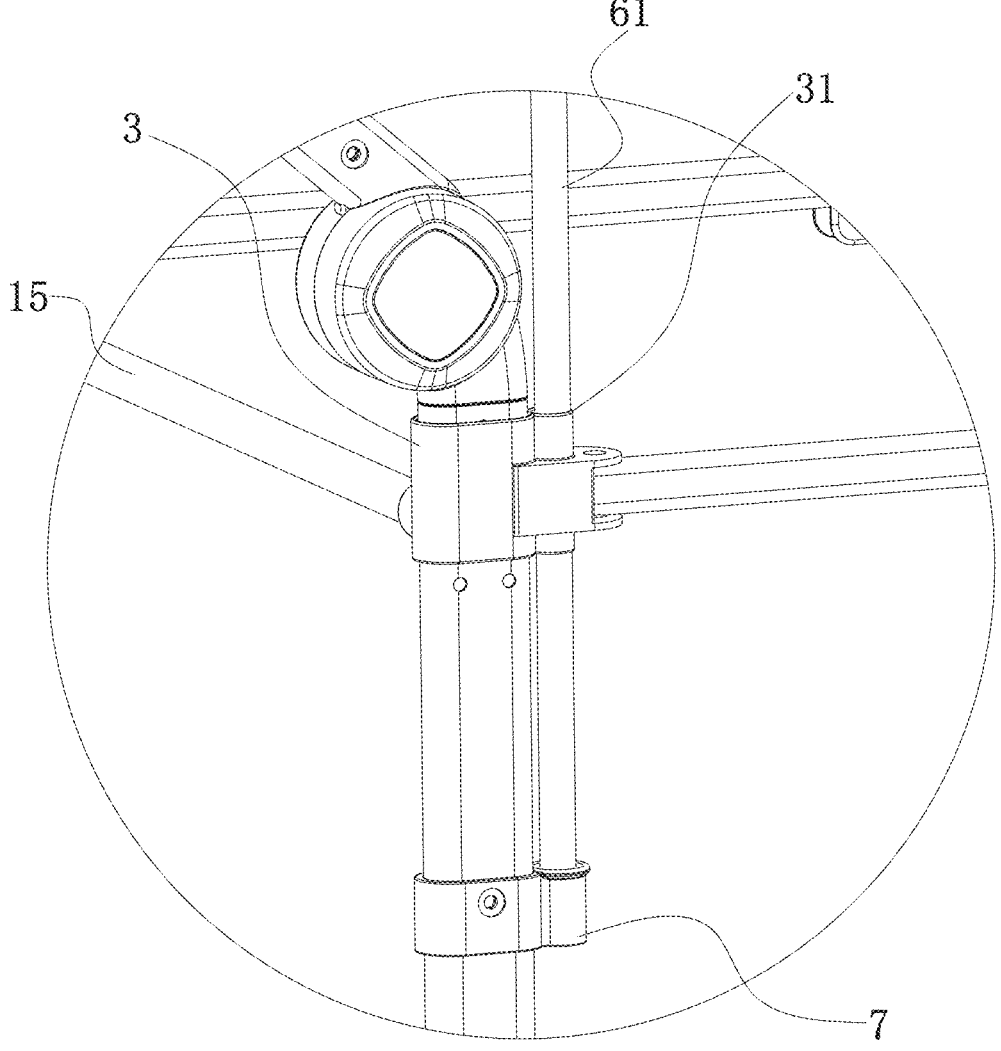
FIG. 2 is an enlarged schematic view of area A in FIG. 1.

In this embodiment, referring to FIG. 2, the two first pillars 11 on the front side of the bottom frame 1 and the two second pillars 12 on the rear side of the bottom frame 1 are each equipped with a rotating member 3 for mounting the cart door 2. The cart door 2, through cooperation with the rotating member 3, facilitates the opening or closing of the side formed by the first pillar 11 and the second pillar 12 located on the same side. The rotating member 3 can drive the cart door 2 to rotate, allowing the cart door 2 to revolve around the first pillar 11 or the second pillar 12, thereby revealing the internal space of the handcart with side-opening cart doors.

Furthermore, as a preferred embodiment of this solution rather than a limitation, referring to FIGS. 1, 2, 4, and 6, two rotating members 3 are spaced apart on each first pillar 11 and each second pillar 12 to cooperate with the control of the cart door 2, enabling the cart door 2 to rotate through the rotating members 3. The spacing of the two rotating members 3 can make the rotation of the cart door 2 more stable and smoother, facilitating the rotation of the cart door 2, thereby enabling the cart door 2 to rotate more smoothly around the first pillar 11 or around the second pillar 12, thus revealing the internal space of the handcart capable of being laterally opened.

Furthermore, as a preferred embodiment of this solution rather than a limitation, referring to FIG. 2, the rotating member 3 is a pivot shaft structure that is hingedly connected to one end of the cart door 2. The pivot shaft structure of the rotating member 3 enables the cart door 2 to rotate around the rotating member 3, thus achieving the opening and closing action of the cart door 2.

Alternatively, the rotating member 3 can also be a hinge with one end mounted on a first pillar 11 and the other end mounted on the cart door 2, or a hinge structure with one end mounted on a second pillar 12 and the other end mounted on the cart door 2.

Furthermore, as a preferred embodiment of this solution rather than a limitation, referring to FIGS. 1, 4, and 6, the first pillar 11 is equipped with a first cart door 21, and the second pillar 12 is equipped with a second cart door 22. The first cart door 21 on the first pillar 11 and the second cart door 22 on the second pillar 12, located on the same side, can form one side of the frame of a handcart capable of being laterally opened. The cart doors include the first cart door 21 and the second cart door 22, when the first cart door 21 and the second cart door 22 rotate outward or inward simultaneously, the internal space of the handcart capable of being laterally opened can be revealed. When the first cart door 21 and the second cart door 22 are closed to be parallel with each other, they can form one side surface of the handcart capable of being laterally opened, thus facilitating the use of the handcart capable of being laterally opened.

Figure 3:
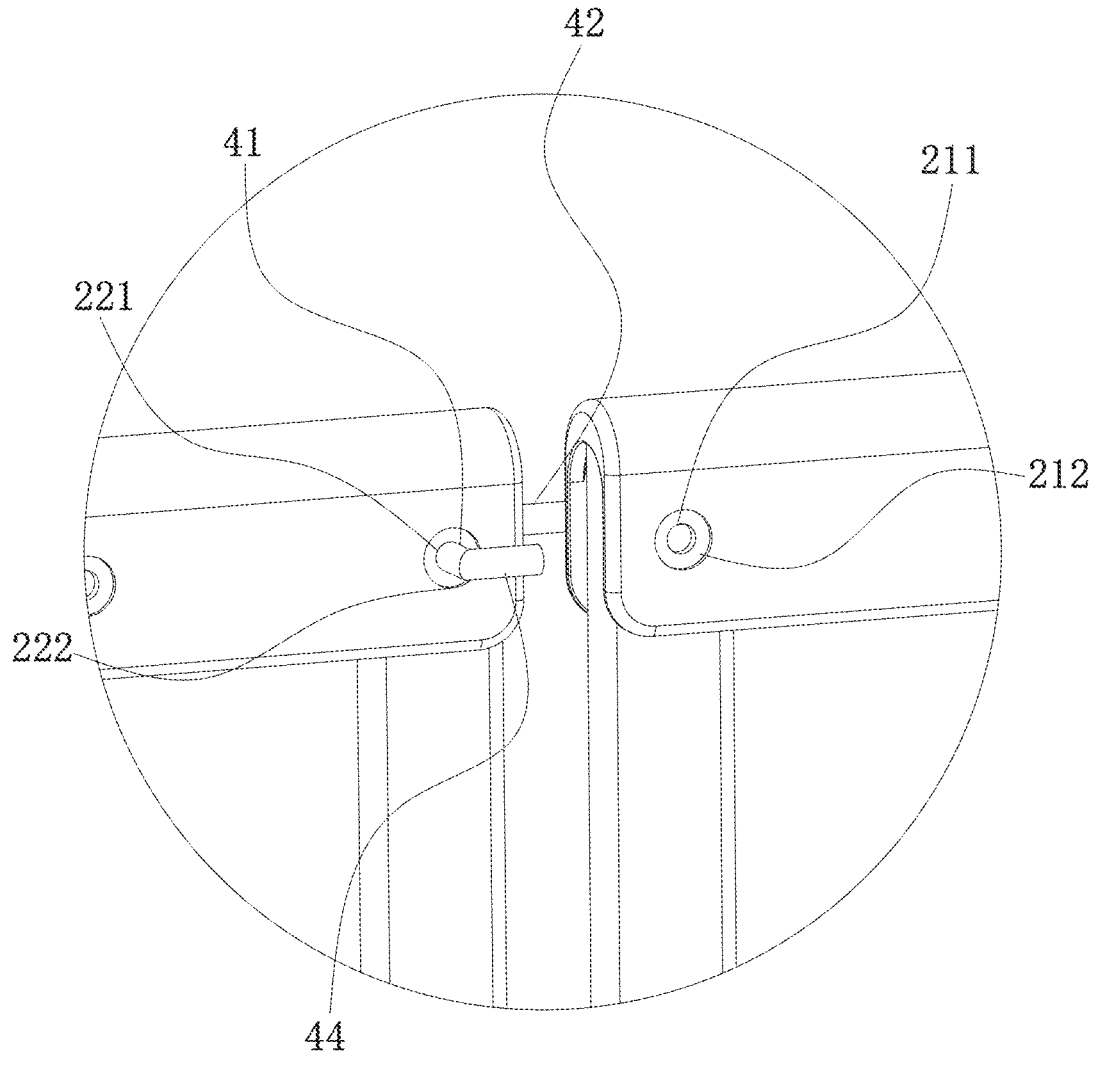
FIG. 3 is an enlarged schematic view of area B in FIG. 1.

Furthermore, as a preferred embodiment of this solution, rather than a limitation, please refer to FIGS. 1 and 3. The first cart door 21 on the first pillar 11 and the second cart door 22 on the second pillar 12, located on the same side, are equipped with locking elements 4 for controlling the closing or opening of the first cart door 21 and the second cart door 22. The locking elements 4 can control the opening and closing of the first and second cart doors 21/22, so that the first and second cart doors 21/22 can be opened, closed, rotated, or fixed to form a side (surface) as needed.

Furthermore, as a preferred embodiment of this solution rather than a limitation, referring to FIG. 3, the first cart door 21 is provided with a first mounting hole 211 for mounting the locking member 4, and the second cart door 22 is provided with a second mounting hole 221 for cooperating with the locking member 4. Optionally, the locking member 4 includes a rotating shaft 41, a connecting shaft 42, and a limiting shaft 43. The rotating shaft 41 of the locking member 4 can move laterally within the first mounting hole 211 and rotate around the first mounting hole 211, and the limiting shaft 43 of the locking member 4 can cooperate with the second mounting hole 221 to enable the first cart door 21 and the second cart door 22 located on the same side to close to form a side surface.

The rotating shaft 41 can slide within the first mounting hole 211. Optionally, a latch shaft 44 is provided on the side of the rotating shaft 41 away from the connecting shaft 42, which allows the locking member 4 to be retained within the first mounting hole 211. The locking member 4 can move laterally within the first mounting hole 211, i.e., it drives the connecting shaft 42 to move, thereby driving the retaining shaft 43 to move laterally. This achieves locking of the first cart door 21 and the second cart door 22 when locking is required. To unlock the first cart door 21 and the second cart door 22, the rotating shaft 41 is first moved laterally, which drives the connecting shaft 42 to move, thereby disengaging the retaining shaft 43 from the second mounting hole 221. Then, by rotating the rotating shaft 41, the locking member 4 is disengaged, thus unlocking the first cart door 21 and the second cart door 22.

Figure 5:
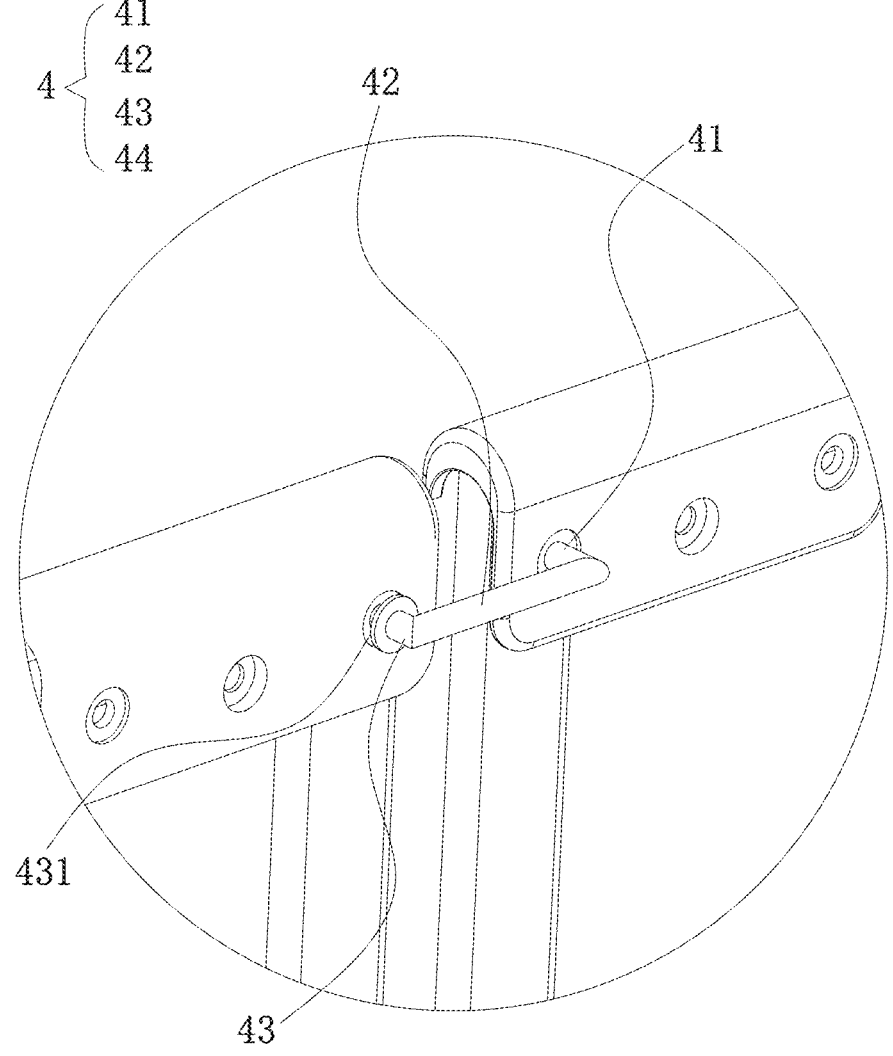
FIG. 5 is an enlarged schematic view of area C in FIG. 4.

Optionally, referring to FIGS. 4 and 5, the rotating shaft 41 of the locking member 4 can also move laterally within the second mounting hole 221 and rotate around the second mounting hole 221. The limiting shaft 43 of the locking member 4 can mate with the first mounting hole 211, allowing the first cart door 21 and the second cart door 22, which are on the same side, to close together to form a side surface. Its working principle is similar to that of the rotating shaft 41 of the locking member 4 being positioned within the first mounting hole 211.

Optionally, the locking member 4 can also be a hinge structure capable of controlling the opening and closing of the first cart door 21 and the second cart door 22 located on the same side.

Furthermore, as a preferred embodiment of this solution rather than a limitation, referring to FIG. 3, the first cart door 21 is provided with a first groove 212 having an inner diameter larger than that of the first mounting hole 211 at a position corresponding to the first mounting hole 211, and the second cart door 22 is provided with a second groove 222 having an inner diameter larger than that of the second mounting hole 221 at a position corresponding to the second mounting hole 221. The limiting shaft 43 is provided with a locking pin 431 corresponding to the first groove 212 and the second groove 222 for temporary fixation. The locking pin 431 corresponds to the first groove 212 and the second groove 222, and when the rotating shaft 41 is installed into the first mounting hole 211, the locking pin 431 can temporarily fix the limiting shaft 43 into the second mounting hole 221.

In this implementation case, referring to FIGS. 1, 3, and 5, the handcart capable of being laterally opened further includes a cart canopy 5 and a pair of U-shaped supporting rod 6 for supporting the cart canopy 5. The rotating member 3 is equipped with alignment mounting holes 31 for cooperating with the support legs 61 of the supporting rod 6 for clamping and securing. The supporting rod 6 can fix the cart canopy 5, and the alignment mounting holes 31 can clamp the support legs 61, facilitating the securing of the cart canopy 5.

Optionally, both the first pillar 11 and the second pillar 12 are equipped with limiting members 7 corresponding to the alignment mounting holes 31 for limiting the position of the support legs 61. The limiting members 7 on the first pillar 11 and the second pillar 12 are located on the same horizontal plane. The limiting members 7 can limit the support legs 61, ensuring that the cart canopy 5 remains horizontal.

Furthermore, as a preferred embodiment of this design rather than a limitation, handlebars 8 are provided between the two first pillars 11 and between the two second pillars 12, with the handlebars 8 on both sides rotatably connected to the two first pillars 11 and the two second pillars 12 respectively. The handlebars 8 are convenient for pushing, and they can also be folded by rotating to ensure good usability.

In this implementation case, the handcart capable of being laterally opened also includes a braking system. Optionally, a brake lever 91 is provided between the two first moving wheels 13. The side of the first moving wheel 13 near the brake lever 91 is equipped with a gear-equipped latch wheel 131. On one side of the brake lever 91, there is a cooperating member 911 that moves with the rotation of the brake lever 91 and is used to cooperate with the gear of the latch wheel 131 to achieve braking and stopping. The braking system facilitates the use of the handcart capable of being laterally opened and ensures safety and convenience when it is used as a tool.

Optionally, the braking system can also be arranged between two second moving wheels 14.

Furthermore, as a preferred embodiment of this solution rather than a limitation, the brake lever 91 is equipped with a brake pedal 912 that can be stepped on to rotate it. The brake pedal 912 enables the braking and starting of the handcart capable of being laterally opened through a stepping action, providing convenience for product use.

When using this product, the rotation of the rotating shaft 41 of the locking member 4 drives the rotation of the limiting shaft 43. This, in turn, facilitates the opening of both the first cart door 21 and the second cart door 22 through the cooperation between the cart doors and the rotating member 3. This allows for the exposure of the internal space of the product, facilitating the loading and unloading of items. Consequently, this enhances the practicality of the product and ensures convenient use.

Embodiment 2

The difference between this embodiment and embodiment 1 lies in that a cart door 2 capable of rotating to open and close the trolley frame is movably arranged between the first pillar 11 and the second pillar 12 located on the same side. One end of the cart door 2 is rotatably connected to the first pillar 11, and the other end of the cart door 2 is provided with a locking device (not shown in the FIG.) for temporary fixation with the second pillar 12. The cart door 2 can be rotatably connected to the first pillar 11. Optionally, the cart door 2 can be hingedly connected to the first pillar 11, allowing the cart door 2 to rotate around the first pillar 11 to open or close. The locking device can unlock the cart door 2 when it needs to be opened to enable the cart door 2 to rotate around the first pillar 11, and temporarily fix the cart door 2 when it needs to be closed to restrict the rotation of the cart door 2.

What is claimed is:

1. A handcart capable of being laterally opened, comprising a bottom frame, at least two first pillars arranged on a front side of the bottom frame and at least two second pillars arranged on a rear side of the bottom frame, wherein connecting rods are provided between the two first pillars and between the two second pillars, each of the first pillars is equipped with a first moving wheel at its bottom, and each of the second pillar is equipped with a second moving wheel at its bottom, a cart door configured to be rotated for opening and closing a frame of the handcart is movably arranged between the first pillar and the second pillar located on a same side, wherein rotating members for installing the cart door are arranged on both the two first pillars at the front side of the bottom frame and on both the two second pillars at the rear side of the bottom frame, a side surface formed by the first pillar and the second pillar located on the same side is opened or closed through a cooperation between the cart door and the rotating members.

2. The handcart according to claim 1, wherein two rotating members are spaced apart on each first pillar and each second pillar.

3. The handcart according to claim 1, wherein the rotating member is a pivot shaft structure hingedly connected to one side of the cart door.

4. The handcart according to claim 1, wherein the rotating member is a hinge with one end mounted on the first pillar and the other end mounted on the cart door, or a hinge with one end mounted on the second pillar and the other end mounted on the cart door.

5. The handcart according to claim 1, wherein a first cart door is arranged at the first pillar, a second cart door is arranged at the second pillar, the first cart door on the first pillar and the second cart door on the second pillar, which are located on the same side, form one side surface of the frame of the handcart.

6. The handcart according to claim 5, wherein the first cart door on the first pillar and the second cart door on the second pillar, which are located on the same side, are provided with a locking member for controlling the closing or opening of the first cart door and the second cart door.

7. The handcart according to claim 6, wherein the locking member comprises a rotating shaft, a connecting shaft, and a limiting shaft; the first cart door is provided with a first mounting hole for mounting the locking member, the second cart door is provided with a second mounting hole for cooperating with and mounting of the locking member, the rotating shaft of the locking member is configured to move laterally within the first mounting hole and rotate around the first mounting hole, and the limiting shaft of the locking member is configured to cooperate with the second mounting hole to allow the first cart door and the second cart door located on the same side to close and form a side surface.

8. The handcart according to claim 7, wherein the rotating shaft is configured to slide within the first mounting hole, a latch shaft is provided on a side of the rotating shaft away from the connecting shaft, which allows the locking member to be retained within the first mounting hole.

9. The handcart according to claim 7, wherein the rotating shaft is configured to move laterally within the second mounting hole and rotate around the second mounting hole.

10. The handcart according to claim 7, wherein the first cart door is provided with a first groove having an inner diameter larger than that of the first mounting hole at a position corresponding to the first mounting hole, the second cart door is provided with a second groove having an inner diameter larger than that of the second mounting hole at a position corresponding to the second mounting hole, and the limiting shaft is provided with a locking pin corresponding to the first groove and the second groove for forming a temporary fixation.

11. The handcart according to claim 6, wherein the locking member is a hinge structure capable of controlling the opening and closing of the first cart door and the second cart door located on the same side.

12. The handcart according to claim 1, wherein a brake lever is arranged between two of the first moving wheels, a latch wheel with gear teeth is arranged on a side of the first moving wheel close to the brake lever, and a cooperating member that moves with a rotation of the brake lever and cooperates with the gear teeth of the latch wheel to achieve braking and stopping is arranged on one side of the brake lever.

13. The handcart according to claim 12, wherein the brake lever is provided with a brake pedal for stepping on to drive its rotation.

14. The handcart according to claim 1, further comprising a cart canopy and a U-shaped supporting rod for supporting the cart canopy, the rotating member is provided with an alignment mounting hole for cooperating with, clamping and mounting a support leg of the supporting rod.

15. The handcart according to claim 14, both the first pillar and the second pillar are provided with a limiting member corresponding to the alignment mounting hole for limiting a position of the support leg, the limiting members on the first pillar and the second pillar are located on the same horizontal plane.

16. The handcart according to claim 15, a handlebar is provided between two of the first pillars and between two of the second pillars, respectively, and the handlebars on the front and rear sides are rotatably connected to the two first pillars and the two second pillars, respectively.

\* \* \* \* \*